(12) United States Patent
Patel et al.

(10) Patent No.: US 9,120,356 B2
(45) Date of Patent: Sep. 1, 2015

(54) LOAD ESTIMATION SYSTEM AND METHOD FOR A VEHICLE TIRE

(75) Inventors: Amrita Patel, Copley, OH (US); John Michael Fenkanyn, Akron, OH (US); Kanwar Bharat Singh, Stow, OH (US); Peter Jung-min Suh, Copley, OH (US)

(73) Assignee: The Goodyear Tire & Rubber Company, Akron, OH (US)

( * ) Notice: Subject to any disclaimer, the term of this patent is extended or adjusted under 35 U.S.C. 154(b) by 629 days.

(21) Appl. No.: 13/534,043

(22) Filed: Jun. 27, 2012

(65) Prior Publication Data

US 2014/0005956 A1    Jan. 2, 2014

(51) Int. Cl.
*B60C 23/06* (2006.01)
*B60C 23/04* (2006.01)

(52) U.S. Cl.
CPC ............... *B60C 23/04* (2013.01); *B60C 23/064* (2013.01)

(58) Field of Classification Search
CPC .................................................... B60C 23/064
USPC .......................................................... 702/41
See application file for complete search history.

(56) References Cited

U.S. PATENT DOCUMENTS

| 2003/0058118 A1* | 3/2003 | Wilson ........................ 340/679 |
| 2007/0240501 A1* | 10/2007 | Mancosu et al. ................ 73/146 |
| 2010/0126263 A1* | 5/2010 | Brusarosco et al. ............ 73/146 |

* cited by examiner

*Primary Examiner* — Bryan Bui
(74) *Attorney, Agent, or Firm* — Richard B. O'Planick

(57) ABSTRACT

Estimating a load bearing on a vehicle tire includes an inflation pressure measuring sensor for measuring tire inflation pressure and generating a measured tire inflation pressure signal; a deformation measuring sensor mounted in a tire region of the vehicle tire, the deformation measuring sensor in the form of a piezoelectric bending sensor generating a deformation signal estimating a length of a tire contact patch length as the senor rolls through a tire footprint. Tire rolling speed is estimated from the deformation signal and a peak to peak amplitude variation within the deformation signal is detected and measured. An artificial neural network receives the tire rolling speed estimation, the contact patch length estimation, the amplitude variation within the deformation signal, and the measured inflation pressure of the tire. The artificial neural network adaptively interprets the input data and generates an output load estimation based thereon.

14 Claims, 20 Drawing Sheets

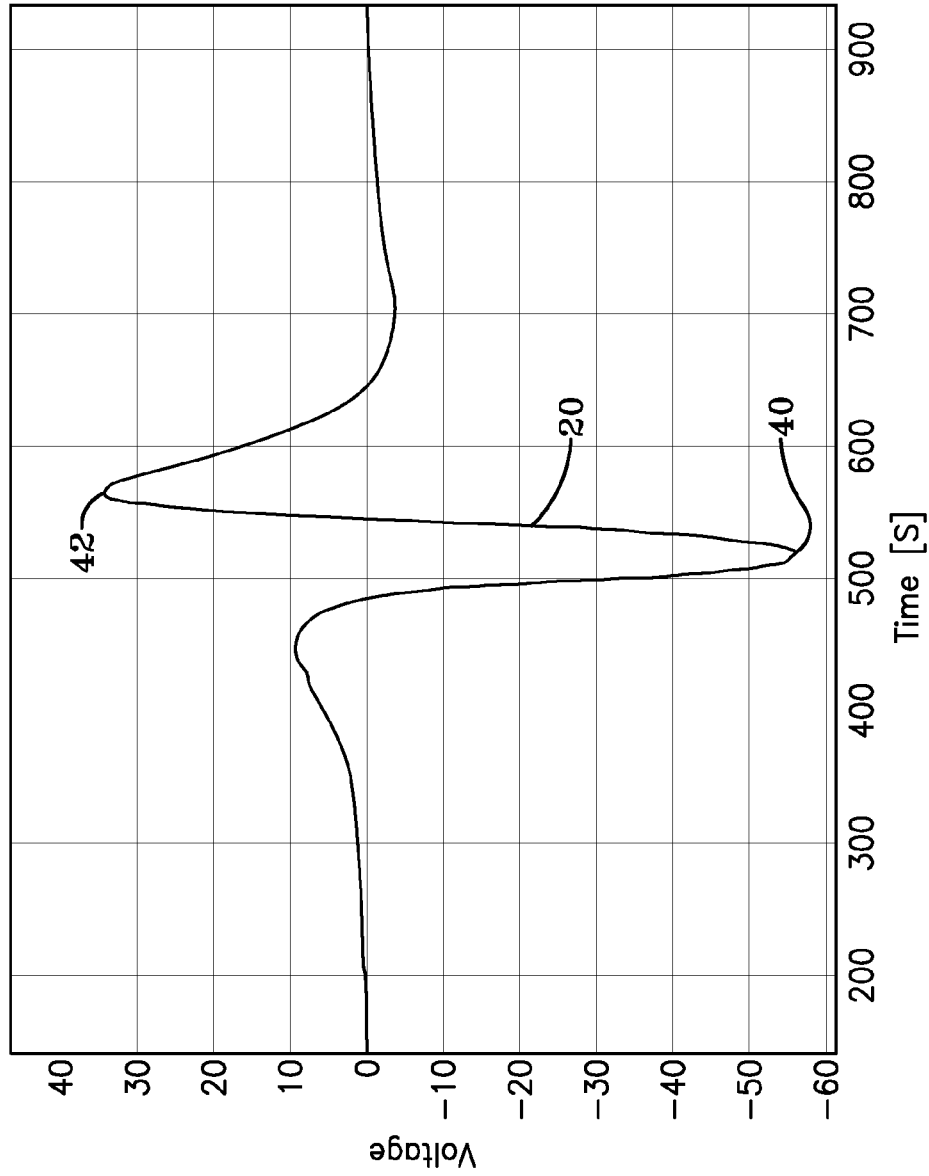

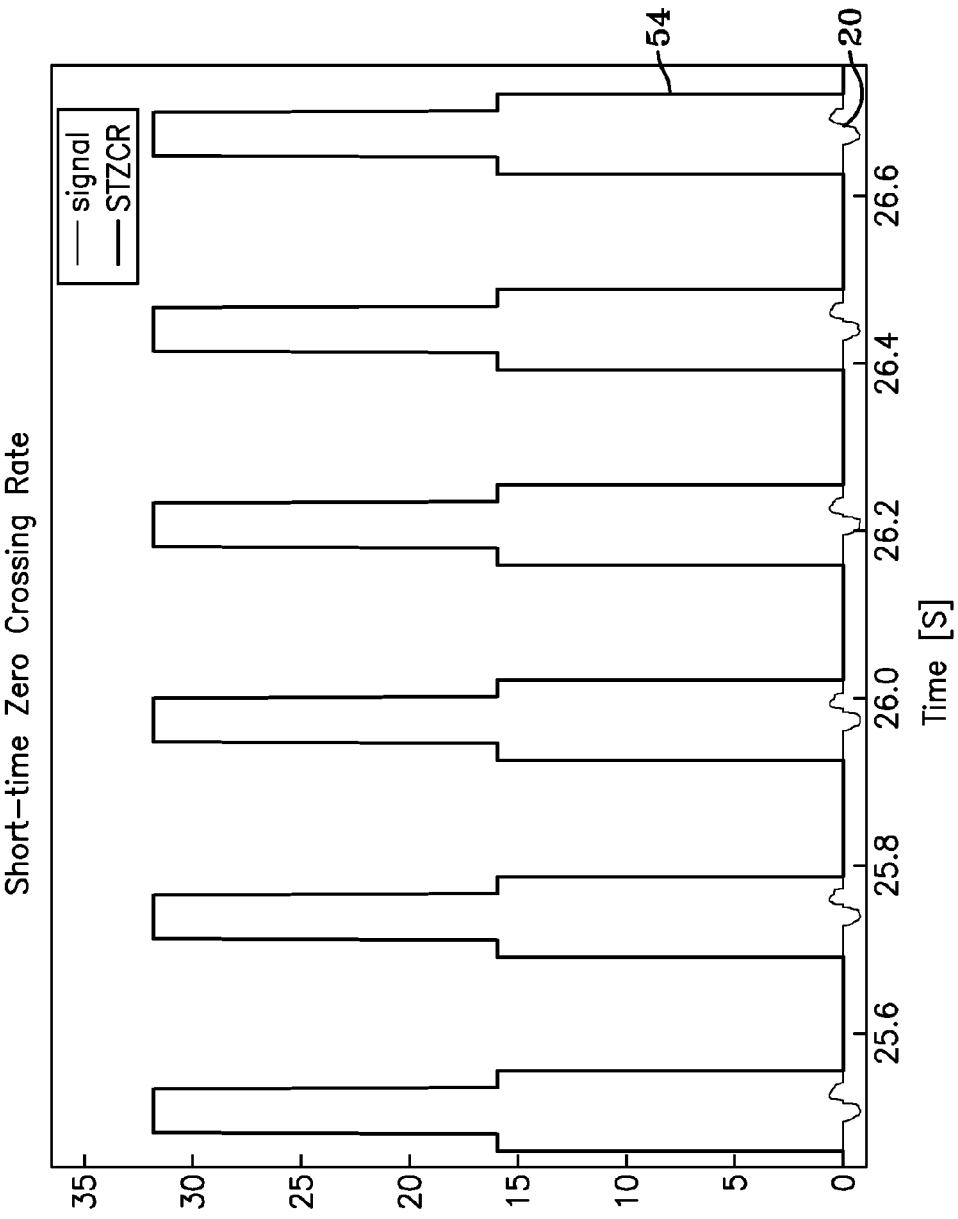

LOAD ESTIMATION SYSTEM AND METHOD FOR A VEHICLE TIRE

FIELD OF THE INVENTION

The invention relates generally to tire monitoring systems for collecting measured tire parameter data during vehicle operation and, more particularly, to systems for estimating vehicle tire loading based upon such measurements.

BACKGROUND OF THE INVENTION

Vehicle-mounted tires may be monitored by tire pressure monitoring systems (TPMS) which measure tire parameters such as pressure and temperature during vehicle operation. Data from TPMS tire-equipped systems is used to ascertain the status of a tire based on measured tire parameters and alert the driver of conditions, such as low tire pressure or leakage, which may require remedial maintenance. Sensors within each tire are either installed at a pre-cure stage of tire manufacture or in a post-cure assembly to the tire.

Other factors such as tire loading are important considerations for vehicle operation and safety. It is accordingly further desirable to measure tire loading and communicate load information to a vehicle operator in conjunction with the measured tire parameters of pressure and temperature.

SUMMARY OF THE INVENTION

A system and method of estimating a load bearing on a vehicle tire includes an inflation pressure measuring sensor for measuring tire inflation pressure and generating a measured tire inflation pressure signal; a deformation measuring sensor mounted in a tire region of the vehicle tire, the deformation measuring sensor in the form of a piezoelectric bending sensor generating a deformation signal estimating a length of a tire contact patch against a ground surface. An estimation of tire rolling speed may further be ascertained from the deformation signal. An artificial neural network receives, as input data, the tire rolling speed estimation, the contact patch length estimation, and the measured inflation pressure of the tire. The artificial neural network is adaptively pre-programmed to interpret the input data and generate an output load estimation based thereon.

The invention in another aspect includes the foregoing system and method and includes detecting a leading and a trailing contact edge point in the deformation measuring signal using a peak detection algorithm; calculating a peak-to-peak amplitude variation in the deformation signal; and adaptively pre-programming the artificial neural network to interpret the amplitude variation in the deformation signal, the tire rolling speed estimation, the contact patch length estimation, and the measured inflation pressure of the tire to render a tire load estimation based thereon In another aspect of the invention, the deformation measuring sensor is in the forms of a piezoelectric bending film sensor mounted at the tire crown region.

According to another aspect, a programmed data processor calculates an estimated contact patch length by employing an event detection algorithm to detect the occurrence of the deformation signal; a peak detection algorithm to detect within the deformation signal contact patch edge points; an estimation algorithm to calculate an edge distance between the contact patch edge points of the deformation signal; and an algorithm for calculating a time-span of the deformation signal by dividing the edge distance by a sampling frequency. An algorithm for calculating a contact patch length applies the time-span to a rolling radius of the tire and calculates an estimation of tire rolling speed by dividing the tire contact patch length by the time-span.

DEFINITIONS

"ANN" or "Artificial Neural Network" is an adaptive tool for non-linear statistical data modeling that changes its structure based on external or internal information that flows through a network during a learning phase. ANN neural networks are non-linear statistical data modeling tools used to model complex relationships between inputs and outputs or to find patterns in data.

"Aspect ratio" of the tire means the ratio of its section height (SH) to its section width (SW) multiplied by 100 percent for expression as a percentage.

"Asymmetric tread" means a tread that has a tread pattern not symmetrical about the center plane or equatorial plane EP of the tire.

"Axial" and "axially" means lines or directions that are parallel to the axis of rotation of the tire.

"Chafer" is a narrow strip of material placed around the outside of a tire bead to protect the cord plies from wearing and cutting against the rim and distribute the flexing above the rim.

"Circumferential" means lines or directions extending along the perimeter of the surface of the annular tread perpendicular to the axial direction.

"Equatorial Centerplane (CP)" means the plane perpendicular to the tire's axis of rotation and passing through the center of the tread.

"Footprint" means the contact patch or area of contact created by the tire tread with a flat surface as the tire rotates or rolls.

"Groove" means an elongated void area in a tire wall that may extend circumferentially or laterally about the tire wall. The "groove width" is equal to its average width over its length. A grooves is sized to accommodate an air tube as described.

"Inboard side" means the side of the tire nearest the vehicle when the tire is mounted on a wheel and the wheel is mounted on the vehicle.

"Lateral" means an axial direction.

"Lateral edges" means a line tangent to the axially outermost tread contact patch or footprint as measured under normal load and tire inflation, the lines being parallel to the equatorial centerplane.

"Net contact area" means the total area of ground contacting tread elements between the lateral edges around the entire circumference of the tread divided by the gross area of the entire tread between the lateral edges.

"Non-directional tread" means a tread that has no preferred direction of forward travel and is not required to be positioned on a vehicle in a specific wheel position or positions to ensure that the tread pattern is aligned with the preferred direction of travel. Conversely, a directional tread pattern has a preferred direction of travel requiring specific wheel positioning.

"Outboard side" means the side of the tire farthest away from the vehicle when the tire is mounted on a wheel and the wheel is mounted on the vehicle.

"Peristaltic" means operating by means of wave-like contractions that propel contained matter, such as air, along tubular pathways.

"Piezoelectric Film Sensor" a device in the form of a film body that uses the piezoelectric effect actuated by a bending of the film body to measure pressure, acceleration, strain or force by converting them to an electrical charge.

"Radial" and "radially" means directions radially toward or away from the axis of rotation of the tire.

"Rib" means a circumferentially extending strip of rubber on the tread which is defined by at least one circumferential groove and either a second such groove or a lateral edge, the strip being laterally undivided by full-depth grooves.

"Sipe" means small slots molded into the tread elements of the tire that subdivide the tread surface and improve traction, sipes are generally narrow in width and close in the tires footprint as opposed to grooves that remain open in the tire's footprint.

"Tread element" or "traction element" means a rib or a block element defined by having a shape adjacent grooves.

"Tread Arc Width" means the arc length of the tread as measured between the lateral edges of the tread.

BRIEF DESCRIPTION OF THE DRAWINGS

The invention will be described by way of example and with reference to the accompanying drawings in which:

FIG. 4A is a graph showing initial step of acquiring tire deformation signal.

FIG. 4B is a graph showing the second step of detecting the zero-crossing point.

FIGS. 4A-4E are a graphical representation of the rolling speed and odometer estimation algorithm.

DETAILED DESCRIPTION OF THE INVENTION

Figure 1:
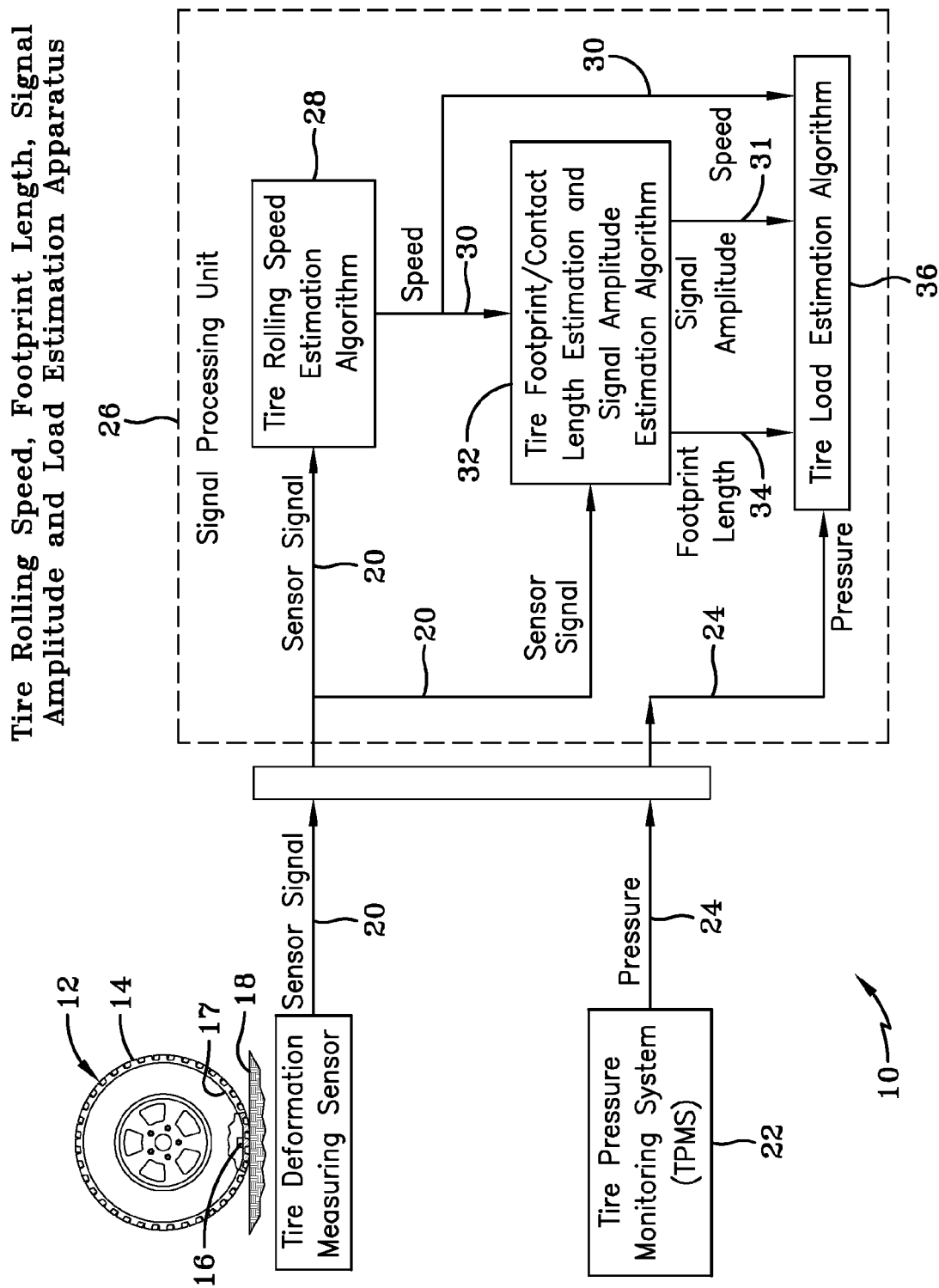
FIG. 1 is a diagrammatic view of tire rolling speed, footprint length and load estimation system and methodology.
Figure 2:
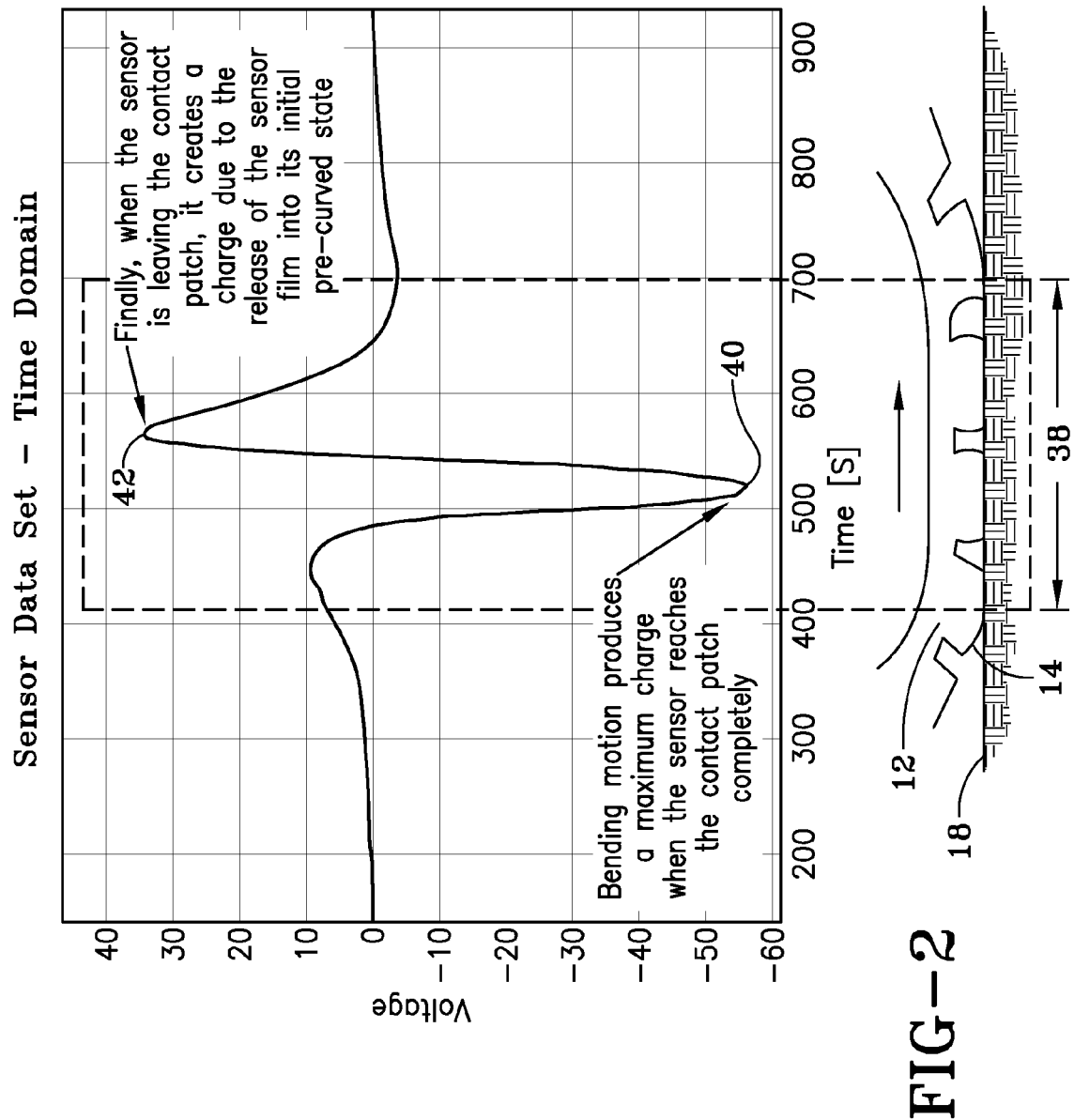
FIG. 2 is a deflection sensor data set-time domain graph showing a representative signal from the piezoelectric sensor bending within a tire footprint/contact patch.

Referring to FIGS. 1 and 2, a system and apparatus 10 for estimating tire load from tire rolling speed, footprint length, and tire pressure is shown in diagrammatic form. The system 10 is incorporated into a tire 12 of conventional construction, having a tread component 14 at a tire crown region which contacts a ground surface 18 during rolling operation. The tire 12 has a tire deformation measuring sensor 16 preferably affixed by adhesive to an underside 17 of the tread component 14 at the crown region in a post-cure assembly operation. The sensor 16 is a piezoelectric bending sensor of a type operational to bend and reconfigure when subjected to a bending force and to transmit a deformation signal 20 indicative of the magnitude of bending reconfiguration in the sensor body. When the bending force is removed, the sensor resumes its original configuration. For the tire application shown, a piezoelectric bending sensor such as bending film sensor commercially offered by Measurement Specialties, Inc. located at 1000 Lucas Way, Hampton, Va. 23666 may be employed. The piezoelectric sensor functionally mounts flush to a surface and a piezoresistive film sensor body, when subjected to a bending force, bends and generates a signal proportional to the magnitude of bending force on the body.

With the generation of the sensor signal 20 is a measurement of tire inflation pressure by a tire pressure monitoring system (TPMS) of a type commercially available. The TPMS system includes a pressure sensor that mounts to a tire in communication with an internal tire air cavity and functions to measure the air pressure within the tire cavity and transmit the measured pressure data to a receiver. The measurement of the TPMS may further include a temperature sensor that measures tire temperature. Measured pressure value 24 of the tire cavity 24 is transmitted by the TPMS system to a data processor for recordation and analysis. Should the pressure falls below a minimum threshold, a warning will be generated to the vehicle operator.

The system and apparatus 10 feeds the tire deformation sensor signal 20 to a signal processing unit 26 for processing in order to ascertain from the signal an estimated tire rolling speed (explained below) 28 and a tire footprint/contact length estimation algorithm 32. An estimated speed 30 is calculated by means of a rolling speed estimation algorithm 28; the estimated speed 30 then being utilized in a tire footprint/contact length estimation algorithm 32 to generate an estimated footprint length 34 and a signal amplitude determination 31. As used herein, "footprint", "contact length", and "contact patch length" are used interchangeably to mean the area of contact created by the tire tread 14 with a flat surface 18 as the tire rotates or rolls. The contact patch length estimation and signal amplitude estimation algorithms 32 produces an estimated footprint length 34 and estimated amplitude 31 which are used with the speed estimation 30 and pressure measurement 24 in a tire load estimation algorithm 36 to produce a tire load estimation.

FIG. 2 is a deflection sensor data set-time domain graph showing a representative signal from the piezoelectric sensor bending within a tire footprint/contact patch 38. The raw deflection signal 20 from the tire deformation sensor 16 is in the form of a single pulse for each tire revolution. It will be appreciated that the sensor 16 is fixedly mounted to the tire in a region that passes through a tire footprint with each revolution of the tire. As the tire mounting region to which the sensor is mounted passes through the footprint, the region bends or deforms, causing the tire deformation sensor mounted to the region to likewise bend. With a bending of the mounting region, the film sensor body bends to an extent proportional to the bending deformation of the tire. The signal 20 output from the sensor 16 reflects a change in voltage as the sensor passes through the tire footprint as shown by the one-cycle signal pulse of FIG. 2. The bending motion in the sensor produces a maximum charge when the sensor reaches the contact patch completely as shown by edge spike 40. Finally, when the sensor is leaving the contact patch, it crates a charge due to the release of the sensor film into its initial pre-curved state as shown by the edge spike 42.

Figure 3:
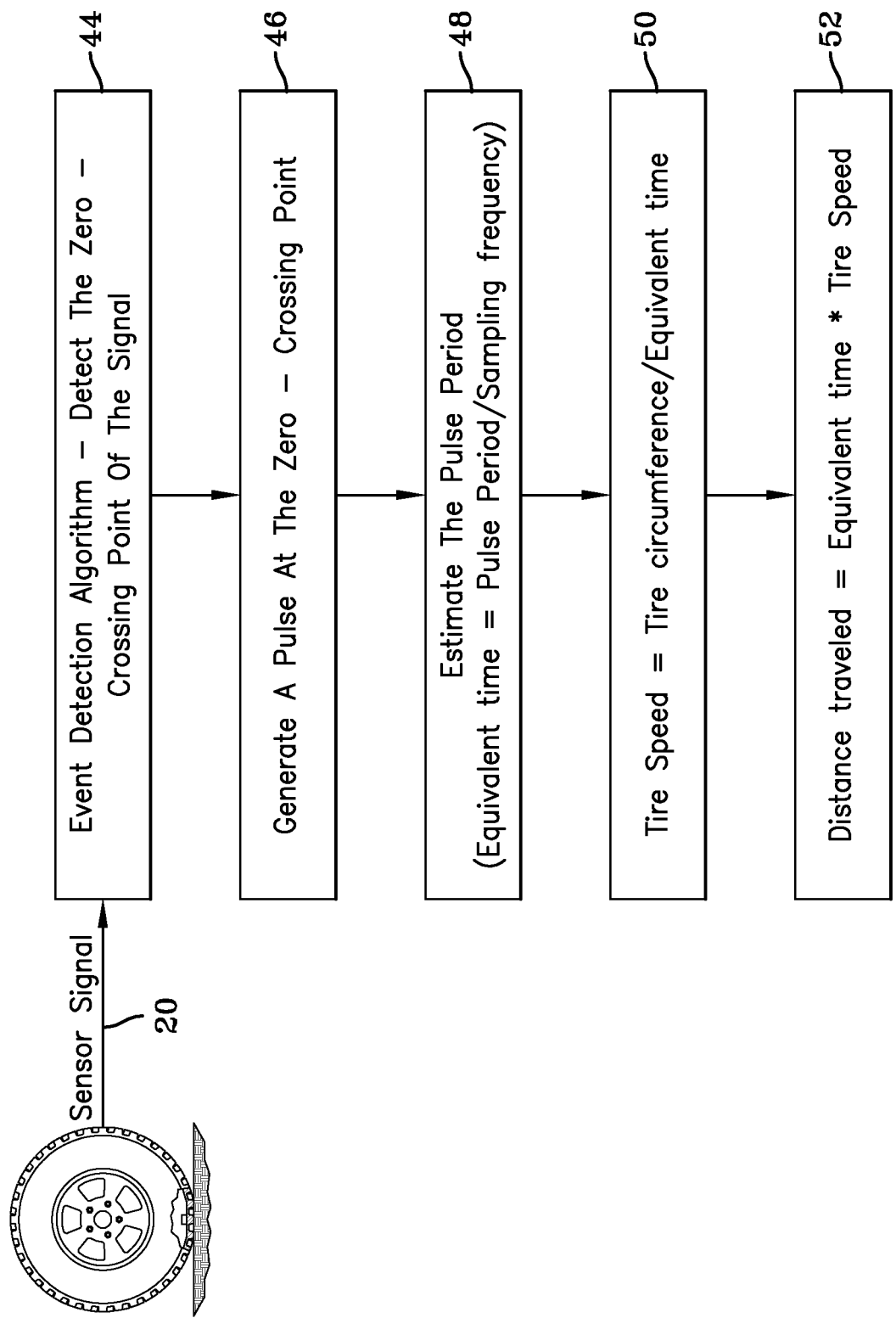
FIG. 3 is a diagrammatic representation of sensor signal evaluation and tire speed and distance traveled calculation.

FIG. 3 is a diagrammatic representation of sensor signal evaluation by means of a tire rolling speed and odometer estimation algorithm. With reference to FIGS. 1, 2, and 3, the sensor signal 20 is processed by signal processor 26. A signal processor event detection algorithm (44) is used to detect the zero-crossing point of the signal. A pulse is generated at the zero-crossing point (46); the pulse period is estimated; and an equivalent time value calculated by taking the pulse period divided by the sampling frequency (48). The tire speed may then be estimated by dividing the tire circumference by the equivalent time (50). The distance traveled (52) is then computed by multiplying the equivalent time times the tire speed.

Figure 4C:
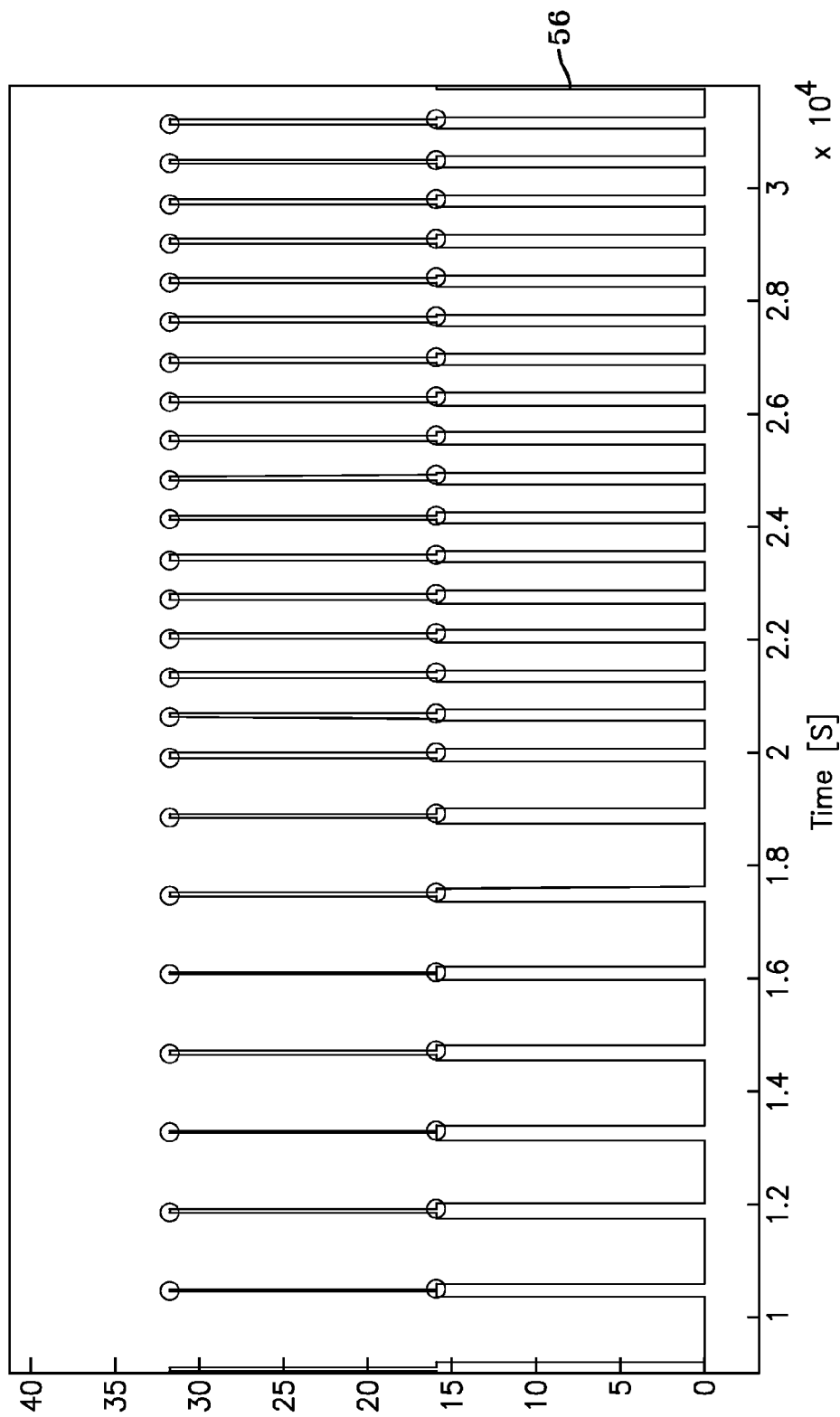
FIG. 4C is a graph showing third step estimation of the pulse period by pulse edge detection over time.
Figure 4D:
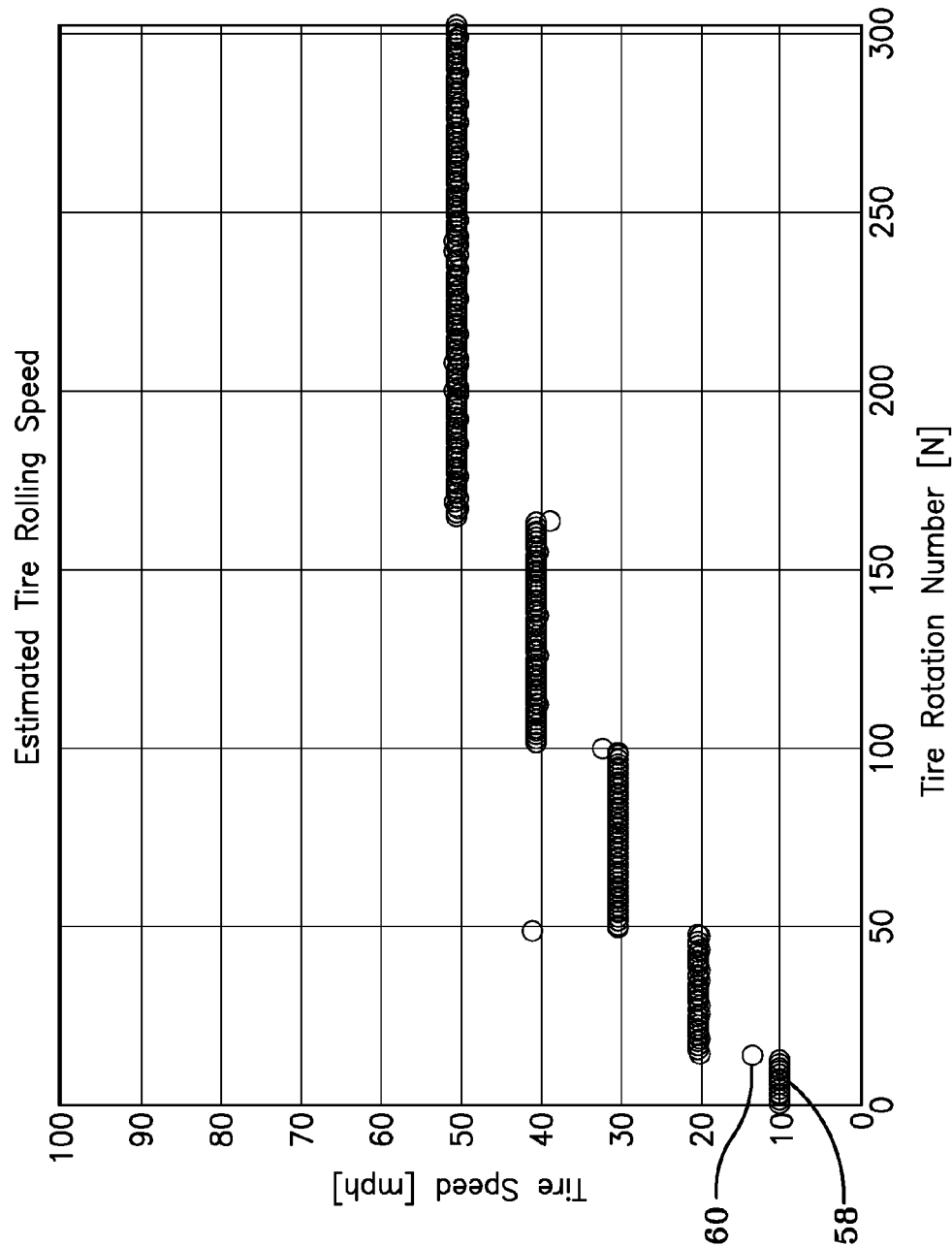
FIG. 4D is a graph showing fourth step estimation of rolling speed of the tire.
Figure 4E:
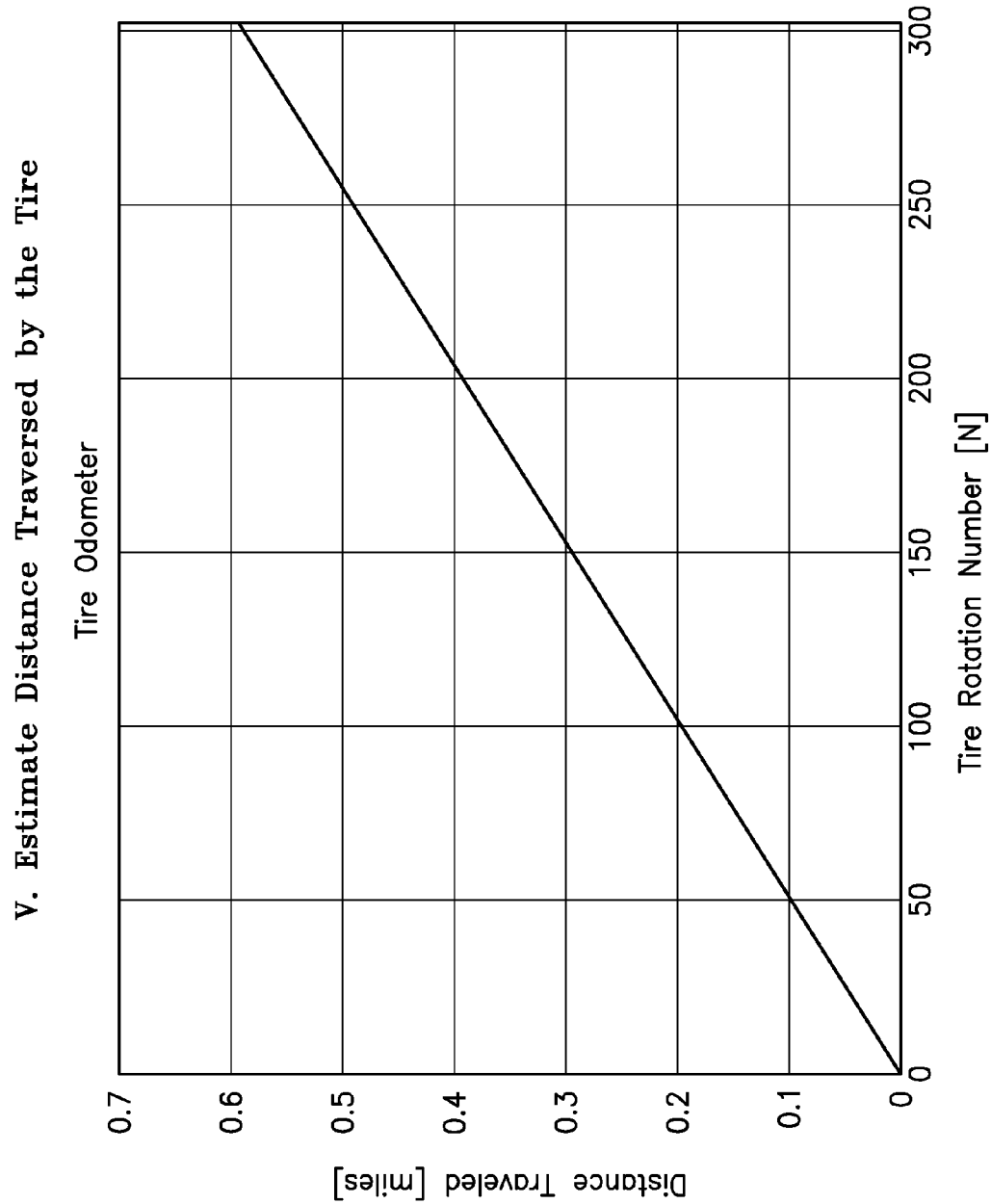
FIG. 4E is a graph showing fifth step estimated distance traversed by the tire; tire odometer distance traveled versus tire rotation number [N]. Combined.

FIGS. 4A-4E represent sequential graphical illustrations of the FIG. 3 rolling speed and odometer estimation algorithm The initial step as shown in FIG. 4A is the acquisition of the tire deformation signal 20 from the deflection sensor mounted in the tire. The pulse signal 20 extends between the leading peak 42 and the trailing peak 40: In FIG. 4A, the zero-crossing point is next determined. FIG. 4A shows the short-time zero crossing rate (STZCR) 54 and the signal 20 over time(S). FIG. 4C shows the next step 56; generating an estimated pulse period by means of pulse edge detection. The fourth step is shown in FIG. 4D as an estimated rolling speed of the tire is determined over sequential tire rotations [N]. In FIG. 4D, the "0" represents the estimated speed vs. actual tire speed 58. As the number of tire rotations [N] increase, the accuracy of the estimation improves. FIG. 4E graphs the estimated distance traveled by the tire as a straight line over tire rotations [N].

As illustrated by FIG. 4B, the second step is to detect by signal processing the zero-crossing point. Re-occurrence of the signal 20 is shown over time with the short-time zero crossing rate (STZCR) graph illustrated. In FIG. 4C, the third step of processing the deformation signal 20 is illustrated graphically. In the third step, the pulse period 48 is estimated by means of pulse edge detection and the time elapsed between the spikes. FIG. 4D graphically shows that the estimated rolling speed 60 of the tire as derived above. It will be noted that "O" represents estimated rolling speed of the tire as compared against the actual tire speed in mph for increasing number of tire rotations [N]. The Estimated Rolling Speed of the tire improves with greater tire rotations [N] and becomes increasingly accurate as the tire rotation number [N] and tire speed in mph increase.

Figure 5:
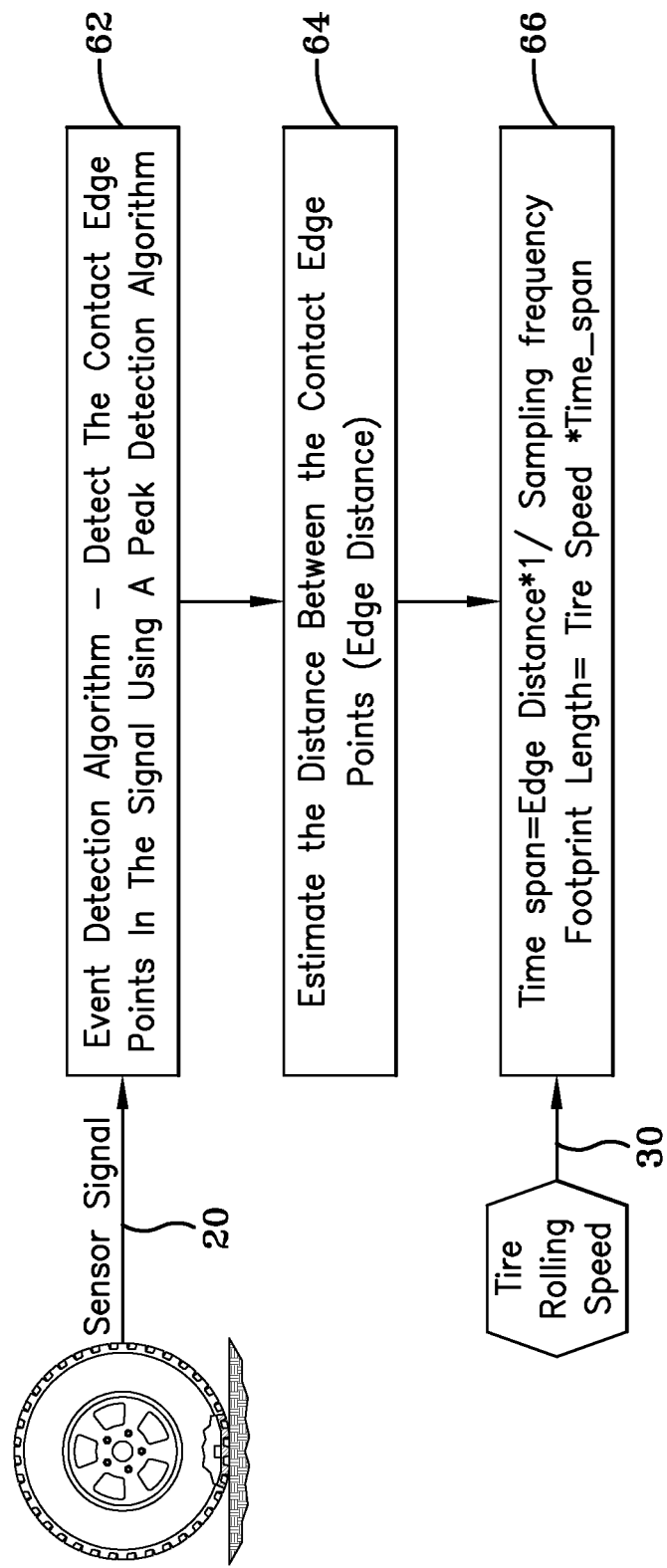
FIG. 5 is a diagrammatic representation of the tire footprint length estimation algorithm.

FIG. 4E graphically shows as a straight line the estimated distance traversed by the tire compared against the tire odometer. The actual distance traveled and the estimated distance traversed correlate, it will be seen, with the increase in tire numerical rotations [N]. In FIG. 5, the algorithm for determining estimated footprint length is shown in block diagram form. The sensor signal 20 is processed as described previously through an event detection algorithm that detects (block 62) contact edge points in the signal using a peak detection algorithm. The estimated distance between the contact edge points (Edge Distance) is determined (block 64) and applied at block 66 to the equation Time-span=Edge Distance times 1/Sampling frequency. With Time-span determined, and the tire rolling speed estimate 30 (as explained previously and represented in FIG. 4D), Footprint Length may be calculated as Tire Speed*Time-span.

Figure 6A:
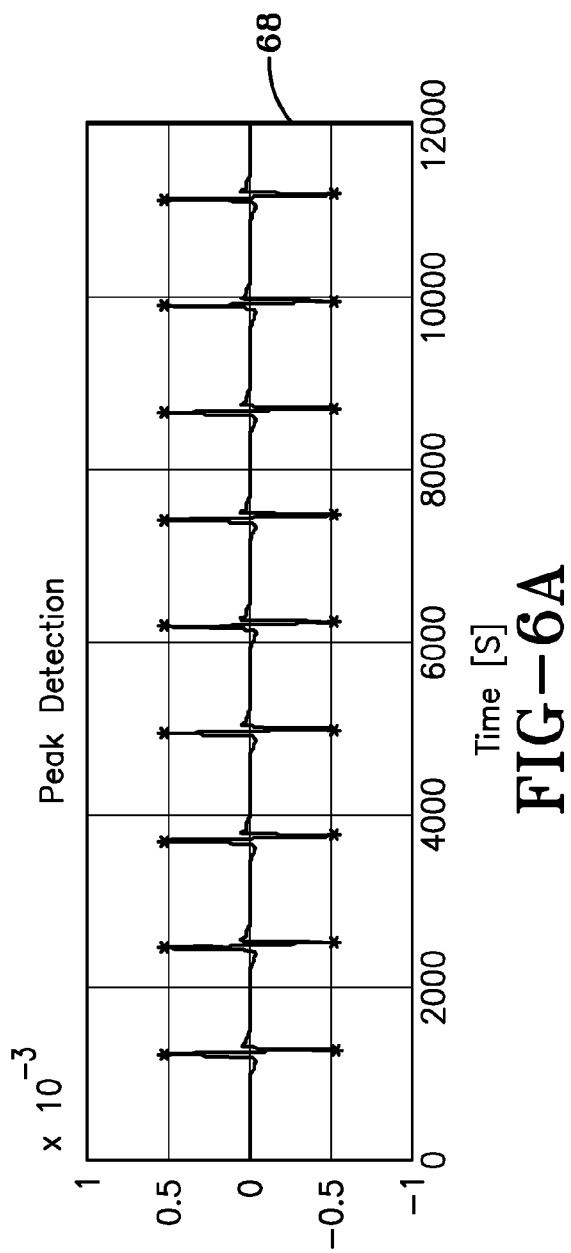
FIGS. 6A and 6B combined are a graphical representation of the footprint length estimation algorithm of FIG. 5.
Figure 6B:
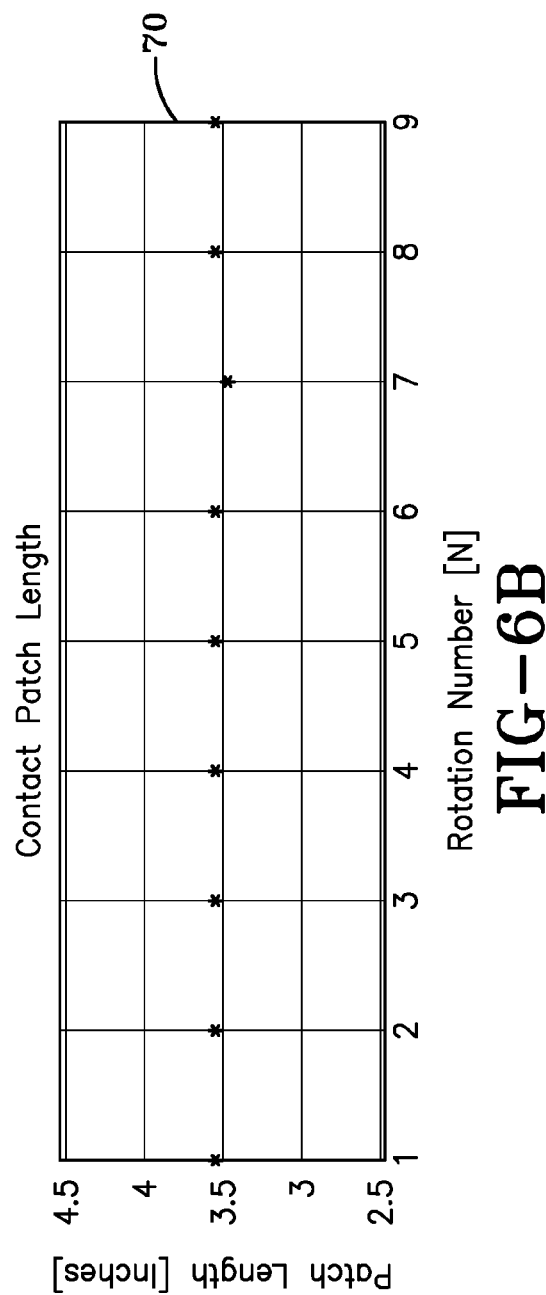

FIG. 6A shows graphically at numeral 68 the Peak Detection over Time(S) and FIG. 6B shows at numeral 70 the graph of Patch or Footprint Length (inches) versus Rotation Number [N] as determined above. The Contact Patch or Footprint Length of a tire rolling against a surface will be affected by tire inflation pressure, with the patch length increasing as the inflation pressure decreases. Stated differently, an underinflated tire will generate a longer contact patch as it rolls and flattens against a surface. The converse is likewise true that an overinflated tire will generate a shorter contact patch length, all other factors being equal.

Figure 7:
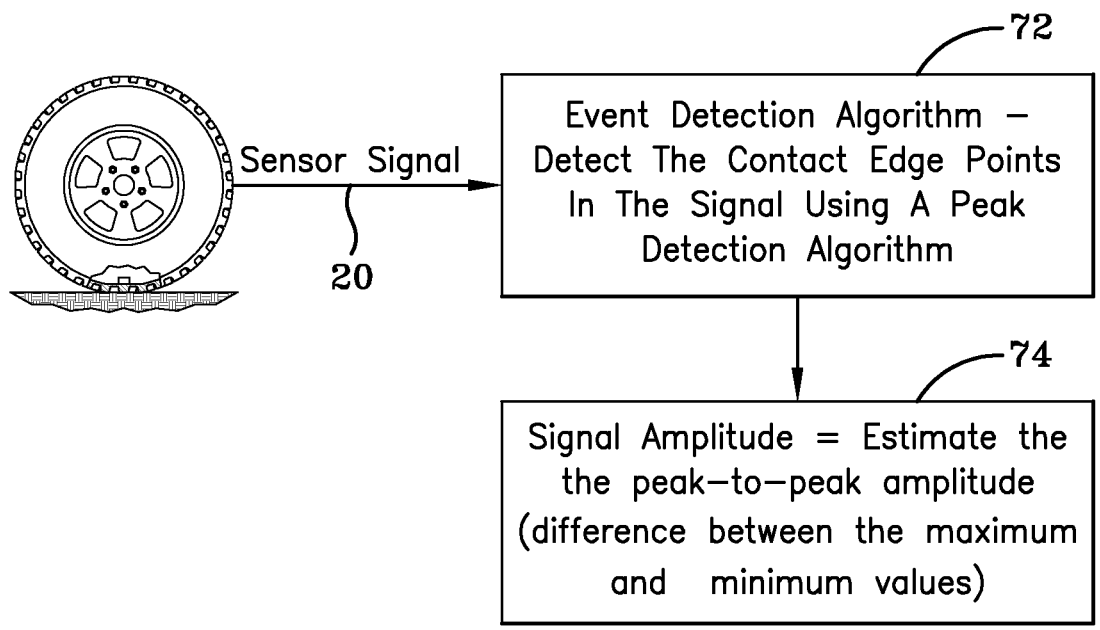
FIG. 7 is a diagram showing the signal amplitude estimation algorithm.
Figure 8:
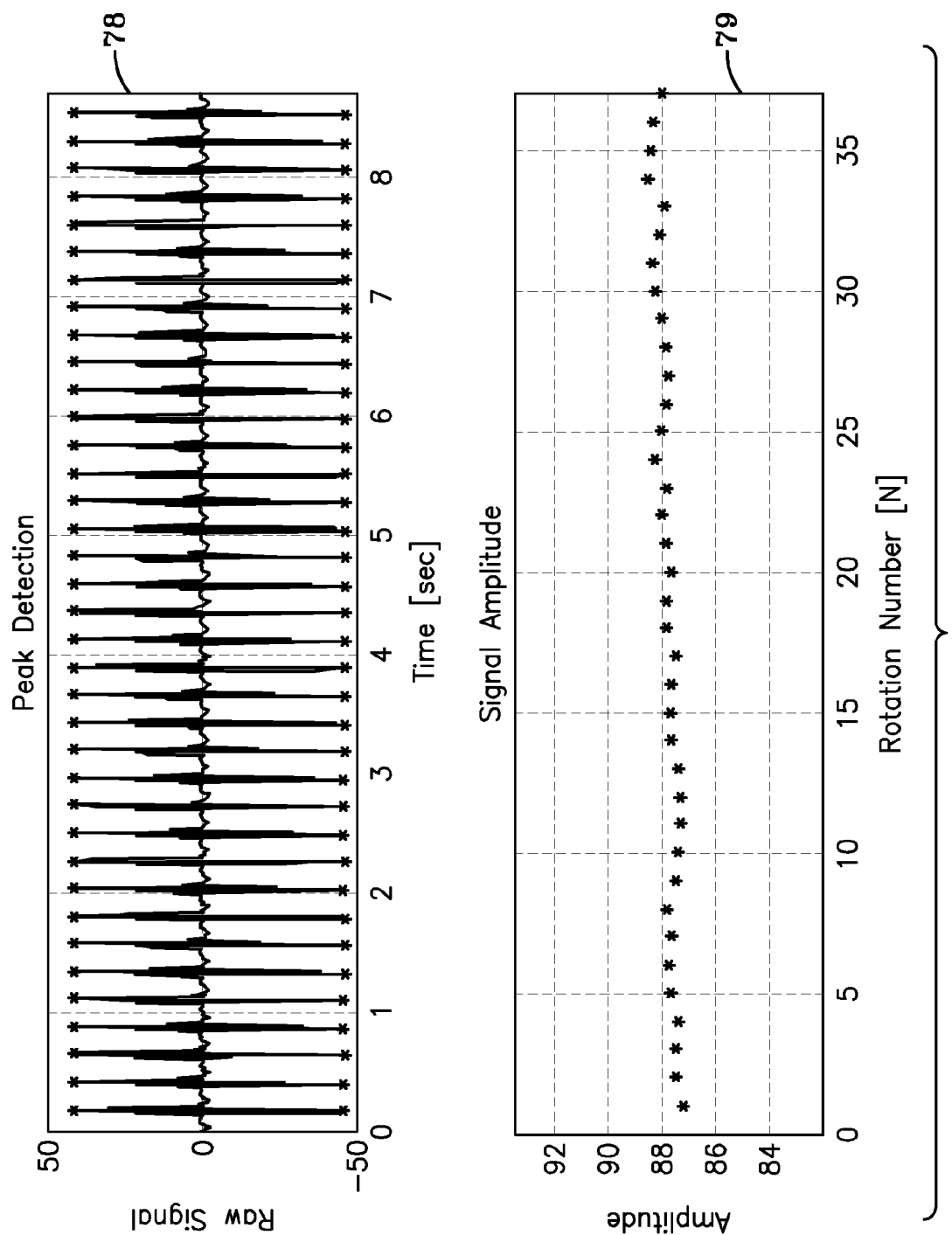
FIG. 8 is a graphical representation of the signal amplitude estimation algorithm of FIG. 7.

FIG. 7 is a block diagram showing the signal amplitude estimation algorithm. The sensor signal 20 is processed through an event detection algorithm 72 which detects the contact edge points in the signal using a peak detection algorithm. The signal amplitude is then determined by estimating the peak-to-peak amplitude 74, measured as the difference between the maximum and the minimum values. FIG. 8 shows graphically the peak detection of the raw sensor signal over time graph 78 and the corresponding signal amplitude determination graph 79 over a rotation number [N]. The signal amplitude 31 is used as shown in FIG. 1 as input in the tire load estimation algorithm 36.

Figure 9:
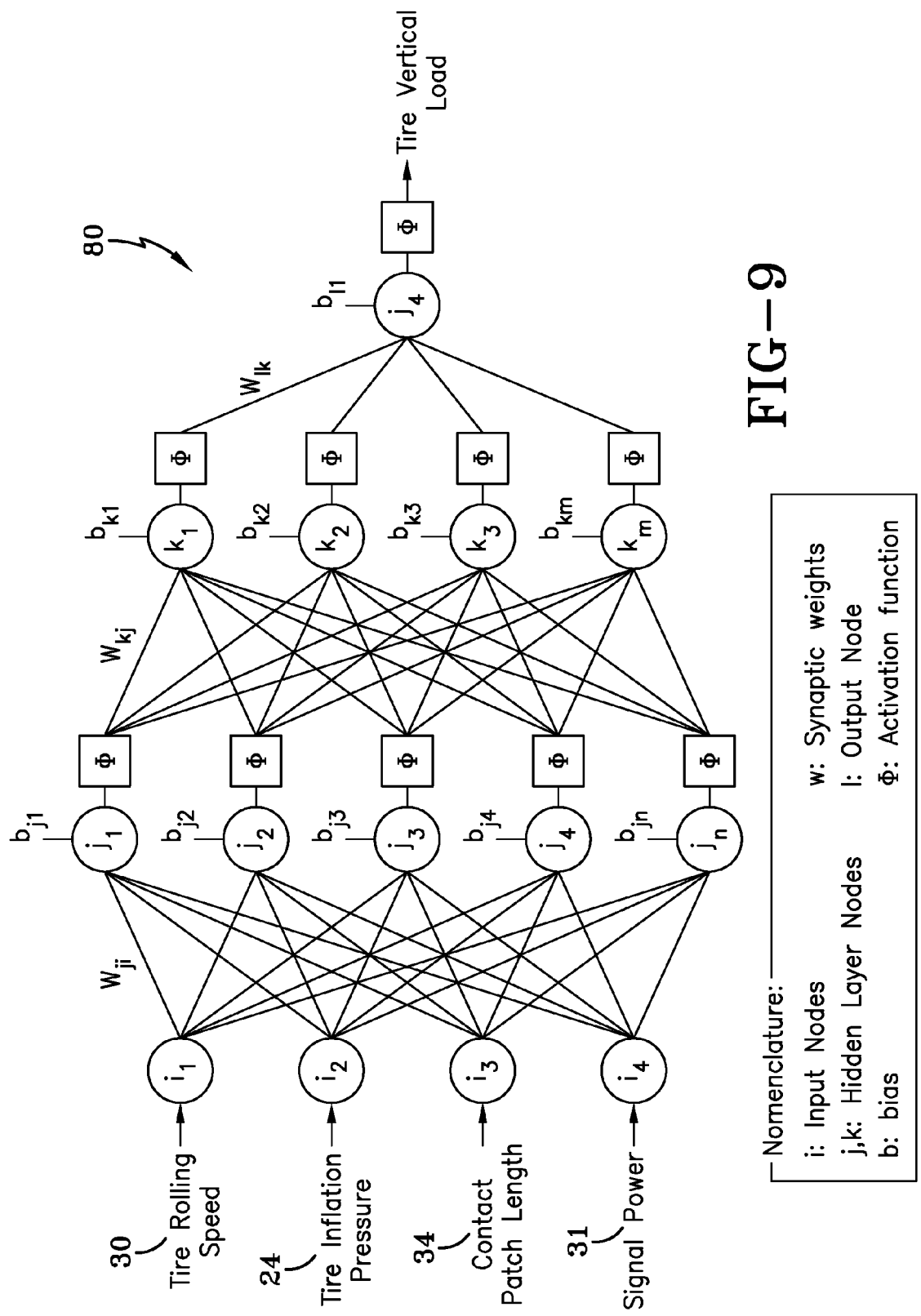
FIG. 9 is a representation of the architecture of a proposed neural network (NN) model.

In FIG. 9, an Artificial Neural Network (ANN) architecture 80 is shown that uses as inputs the tire rolling speed estimation 30, patch length estimation 34, tire inflation pressure 24, and signal power or amplitude 31 derived and generated as explained above. The ANN is adaptively programmed to interpret combination of inputs of speed, patch length, signal amplitude, and tire inflation pressure for a give sized tire and calculate an estimated load based upon such inputs.

ANN Algorithm for Tire Load Estimation

In general, the goal is to develop an explicit ANN based formulation to estimate the tire normal load in terms of tire rolling speed, inflation pressure, contact patch length and signal power. Both indoor and outdoor tire tests were performed to obtain training and testing data sets for the neural network.

A neural network can be thought to be as a massively parallel distributed processor which resembles the human brain in two respects: the knowledge is acquired by the network through a learning process, and inter-neuron connection strengths known as synaptic weights are used to store the knowledge. Neural network operates like a "black box" model, and does not require detailed information about the system. Instead, it learns the relationship between the input parameters and the controlled and uncontrolled variables by studying previously recorded data, in a similar way that a non-linear regression might be performed. Another advantage of using ANNs is their ability to handle large and complex systems with many interrelated parameters.

Figure 14:
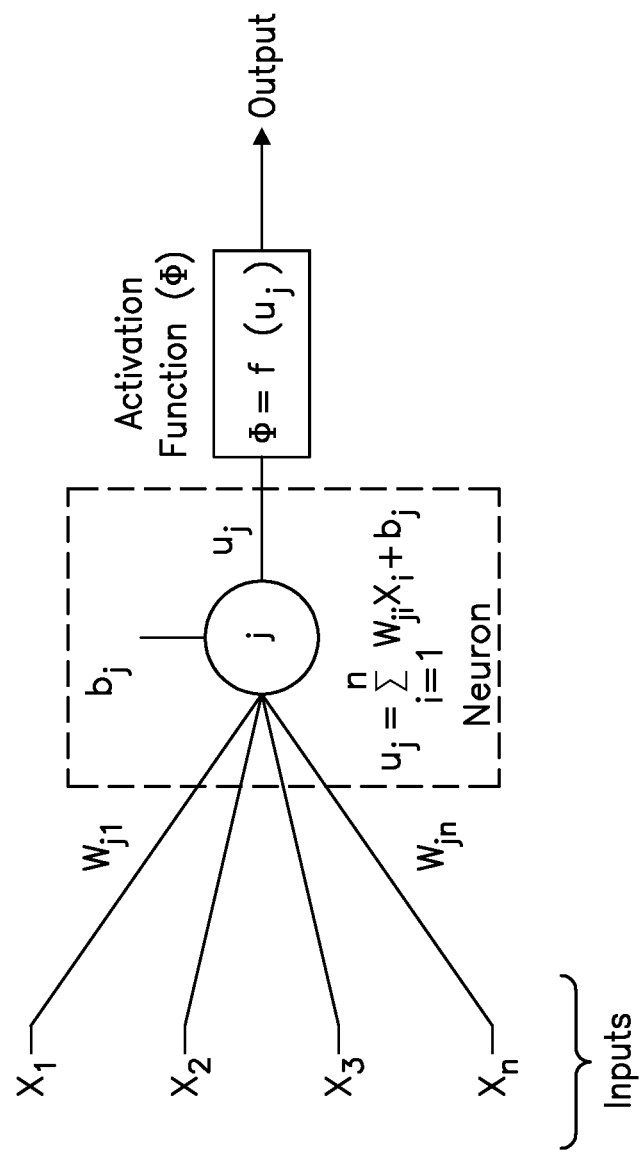
FIG. 14 is a diagram showing the basic elements of an artificial neuron.

Neural network is composed of large numbers of highly interconnected processing elements known as neurons. The basic elements of an artificial neuron are shown in FIG. 14. Artificial neuron consists of weight, bias and activation function mainly. Each neuron receives inputs $x_1, x_2, \ldots, x_n$, attached with a weight $w_{ji}$ which shows the connection strength for a particular input ($x_1$i) for each connection. Every input is then multiplied by the corresponding weight of the neuron connection. A bias $b_j$ can be defined as a type of connection weight with a constant nonzero value added to the summation of inputs and corresponding weights $u_i$, given as indicated in FIG. 14.

$$u_i = \sum_{i=1}^{n} w_{ji} x_i + b_i$$

The summation $u_i$ is transferred using a scalar-to-scalar function called an "activation or transfer function", $f(u_i)$, to yield a value called the unit's "activation", given as $y_i = f(u_i)$. Activation functions serve to introduce nonlinearity into neural networks which makes it more powerful than linear transformation. The training of the network is accomplished by adjusting the weights and is carried out through a large number of training sets and training cycles (epochs). The goal of the learning procedure is to find the optimal set of weights, which in the ideal case would produce the right output for any input. The output of the network is compared with a desired response to produce an error. Once the ANN is adequately trained, it can generalize to similar cases, which it has never seen.

The speed estimation and patch length estimation are derived as explained previously from the deformation signal generated by the piezoelectric bending film sensor. Peak-to-Peak edge identification in the deformation signal is used to estimate the contact patch length and to derive the rolling speed estimate for the tire. The actual inflation pressure 24 is measured using a TPMS tire-based electronic device of a type commercially available. The ANN generates a unique output tire load estimate for any input combinations of speed, pressure, and patch length. The Neural Network utilizes Levenberg-Marquardt training algorithm (trainlm); Mean Squared Error performance determination (mse) algorithm; and Random (dividerand) data division algorithm. The ANN Architecture (3-25-10-1) is as shown schematically at 78 in FIG. 8 and the load estimation (pounds) accuracy verification versus time (seconds) is as shown graphically at numeral 80 in FIG. 11. With "X" representing actual load applied and "O" the Estimated Load Using Neural Networks, it will be seen that accuracy is verified both at lower load levels and higher load levels over time.

Figure 10:
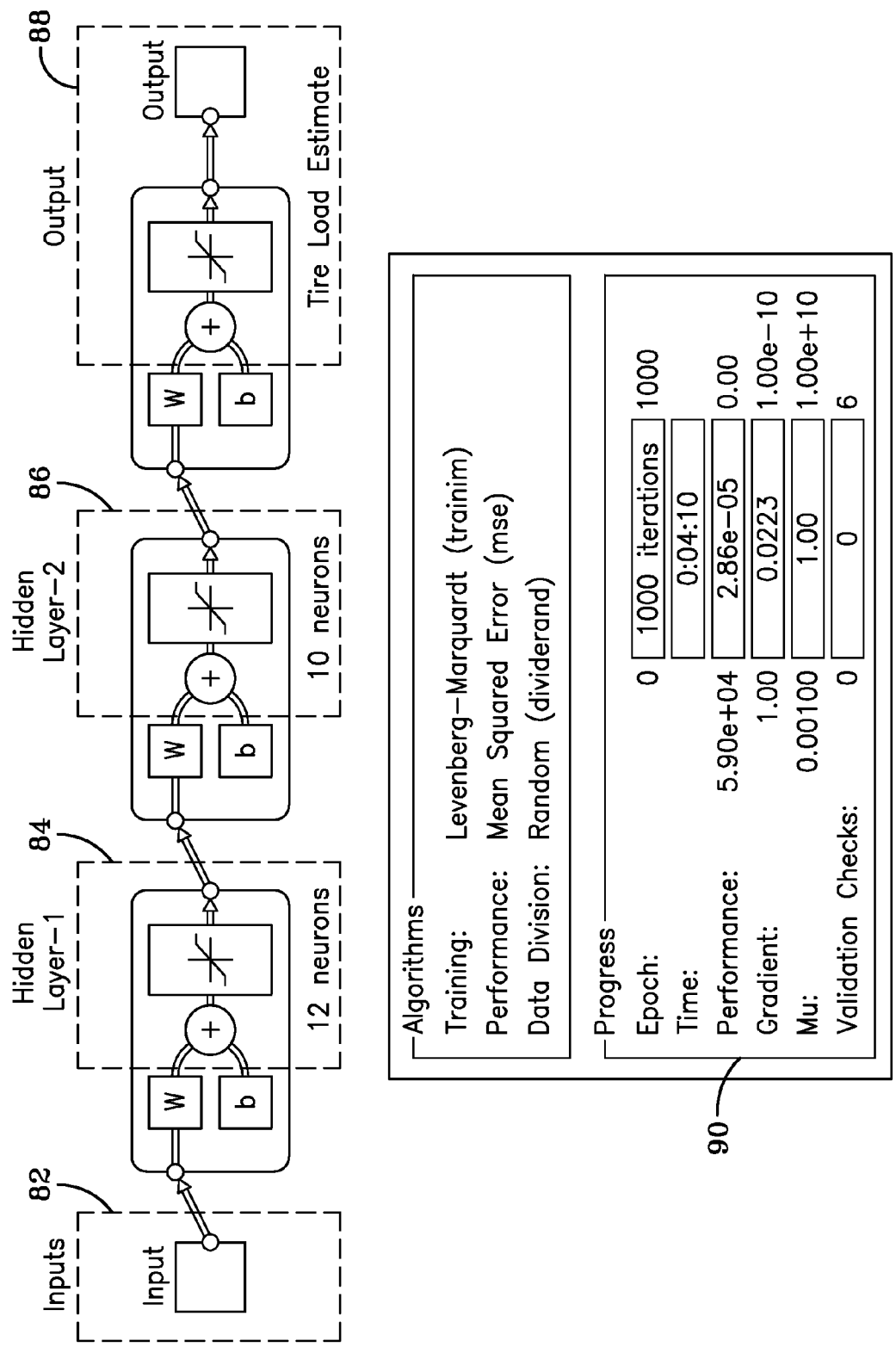
FIG. 10 is a diagram of the Neural Network architecture selected.

FIG. 10 illustrates the ANN architecture selected. The inputs 82 are processed through hidden layer-1 (84) consisting of 12 neurons; Hidden Layer-2 (86) consisting of 10 neurons; to generate for the given inputs a tire load estimate output 88. The algorithms employed are as indicated at 90 of FIG. 10: Training: Levenberg-Marquardt (trainim); Performance: Mean Squared Error (mse); and Data Division: Random (diverand).

Figure 11A:
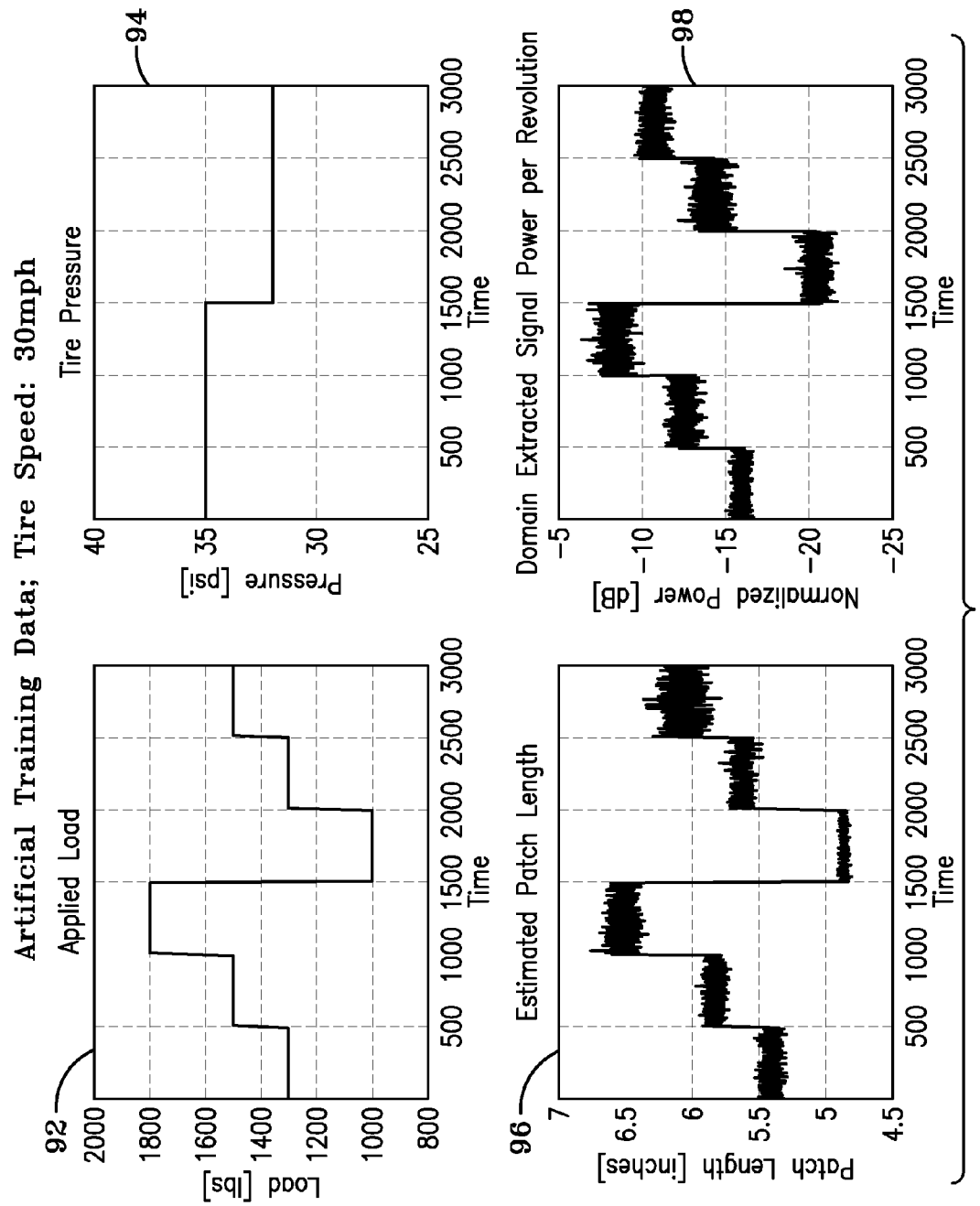
FIG. 11A represents artificial training data for the ANN at a tire speed of 30 mph.
Figure 11B:
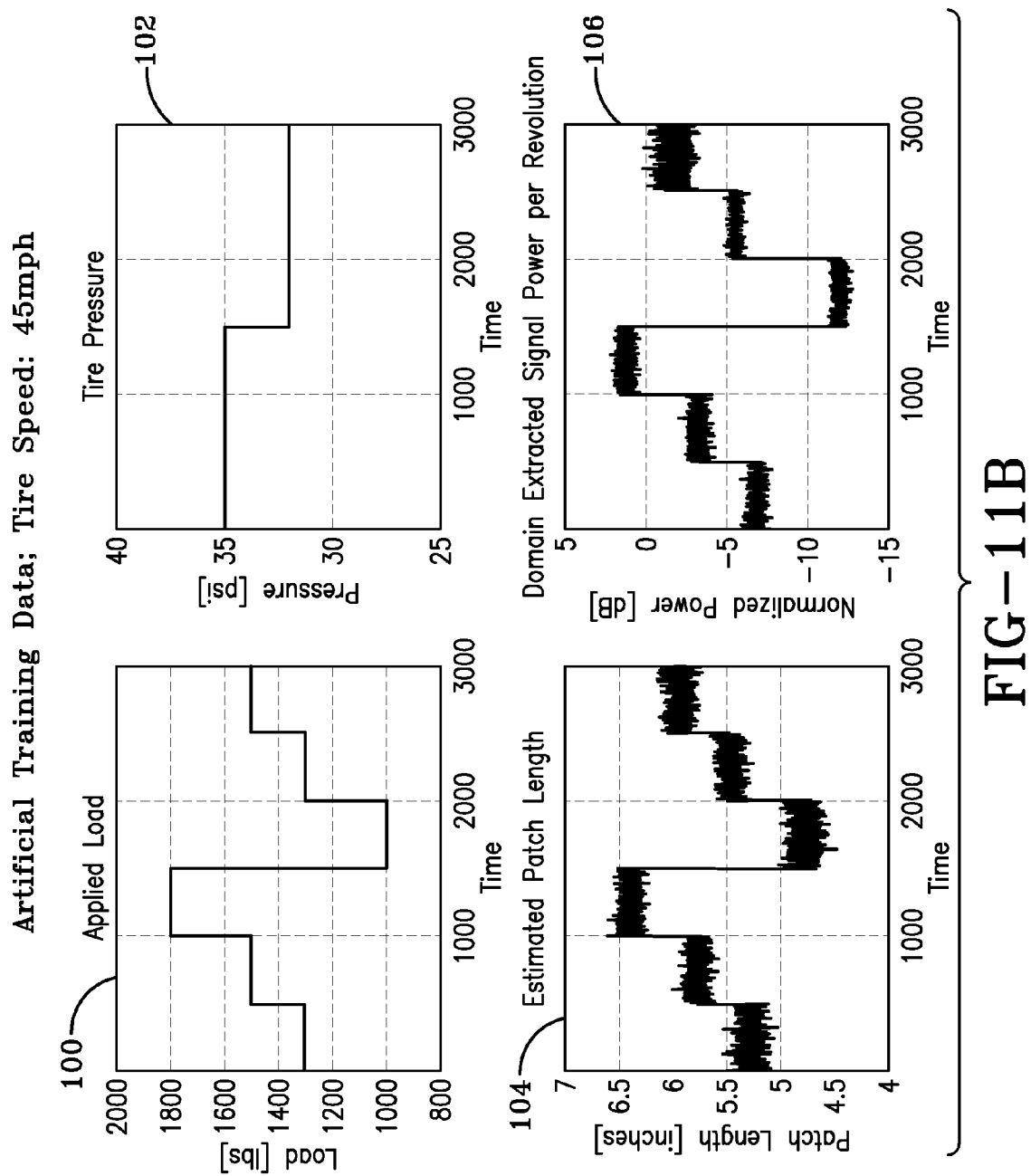
FIG. 11B represents artificial training data for the ANN at a tire speed of 45 mph.
Figure 11C:
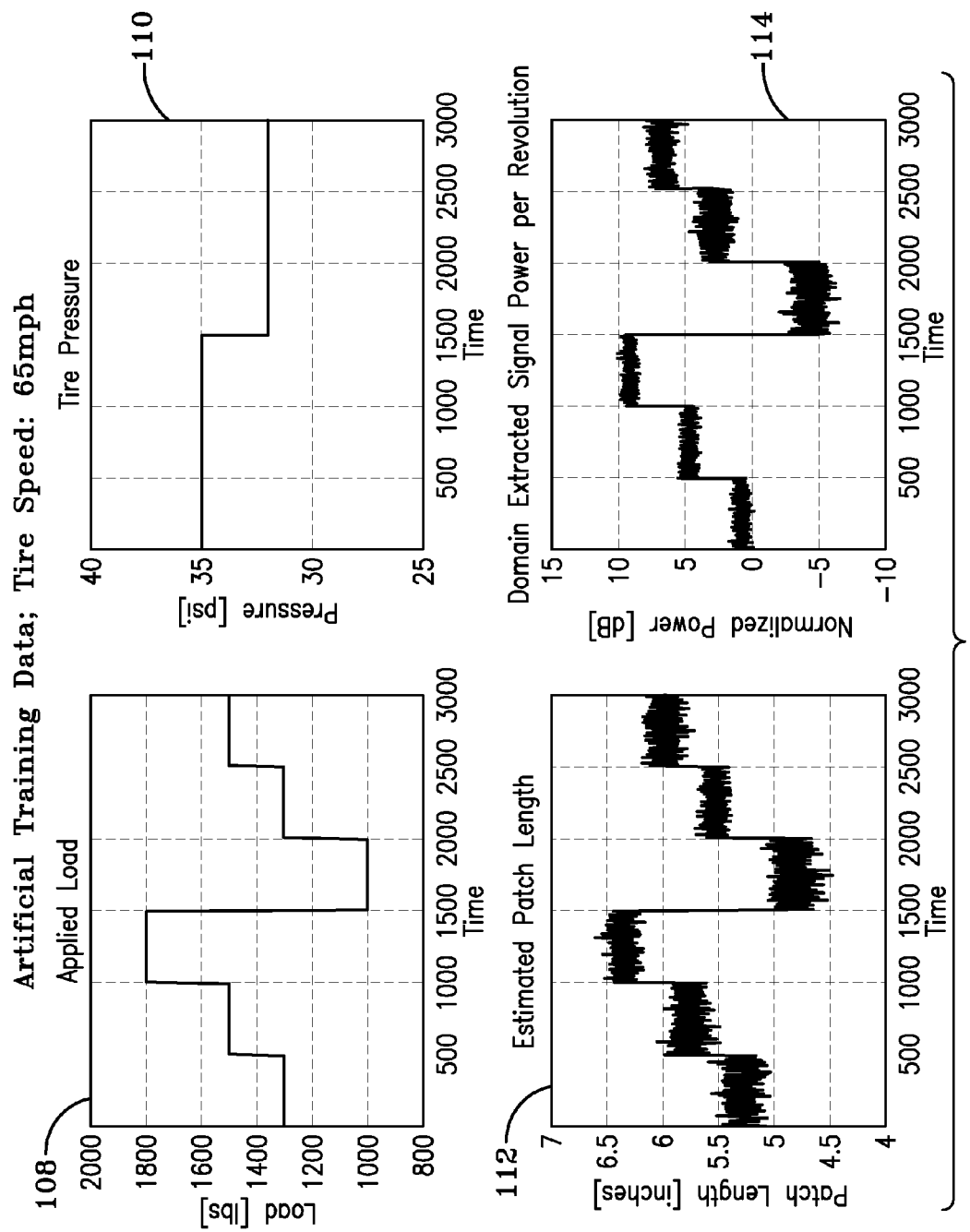
FIG. 11C represents artificial training data for the ANN at a tire speed of 65 mph.

Artificial Training Data for a Tire Speed of 30 mph is as indicated in the graphs of FIG. 11A. Applied Load 92, tire pressure 94, estimated patch length 96, and domain extracted signal power per revolution 98 were applied to the ANN as inputs. FIG. 11B show similar artificial training data utilized for a tire speed of 45 mph, including applied load 100, tire pressure 102, estimated patch length 104, and signal power 106. Additional Artificial Training Data for a tire speed of 65 mph is as indicated in FIG. 11C including the graphs corresponding to applied load 108, tire pressure 110, estimated patch length 112, and signal power 114 inputs to the ANN.

Figure 12:
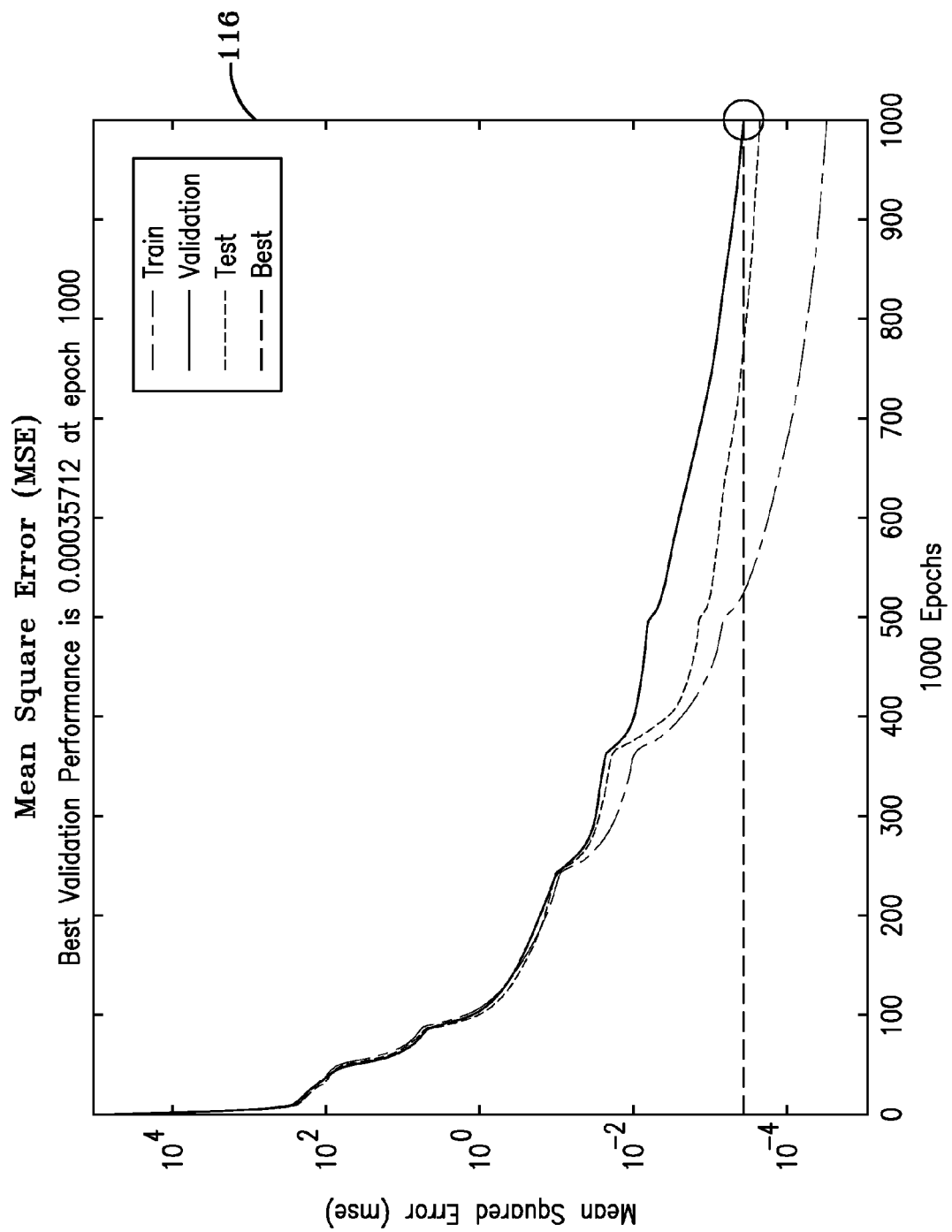
FIG. 12 is a graph representing the ANN training performance as Mean Square Error (MSE).
Figure 13:
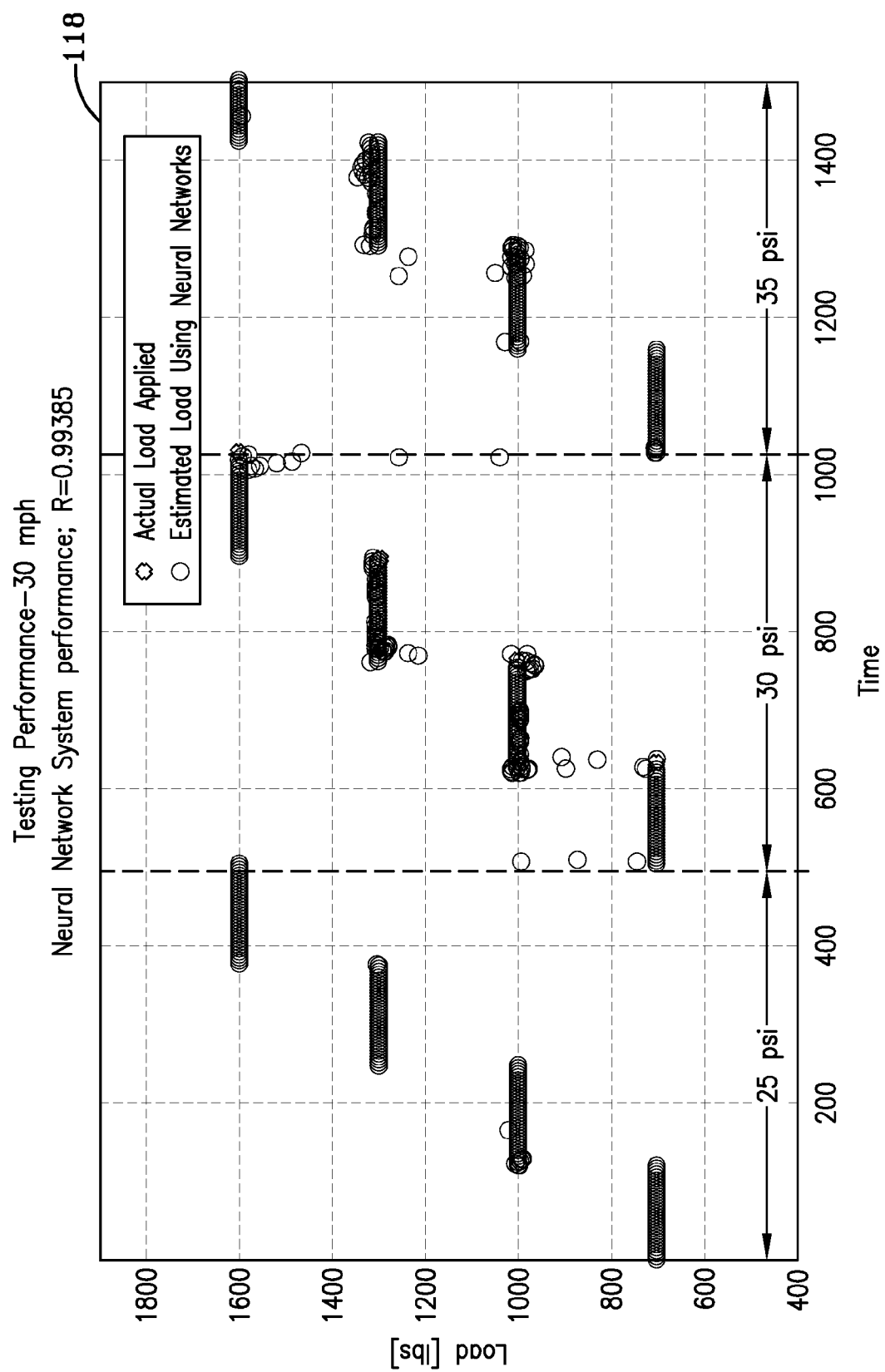
FIG. 13 is a graphical representation of testing performance at 30 mph showing actual load applied against estimated load using NN.

FIG. 12 is a graph 116 representing ANN training performance as Mean Square Error (MSE). Training, validation, test and best validation performance lines are indicated. The best (minimal mse) validation performance was determined to be 0.00035712 at epoch 1000. FIG. 13 is a graph 118 showing testing performance at 30 mph with Neural Network System performance; R-0.99385. The actual load applied is shown in FIG. 13 and compared against the estimated load using the Neural Networks. Good correlation between actual and estimated load validates ANN capability of providing estimated tire load for variable tire speed, tire pressure, patch length and signal power input combinations to an acceptable accuracy level. The signal power input to the ANN provides enhanced accuracy in the load estimate, however, an estimation may be made based solely upon tire speed, tire pressure, and patch length inputs to the ANN if so desired. The addition of signal amplitude as input to the ANN, however, operates as a complementary check to the patch length estimation and thereby provides for a load estimation by the ANN that is more robust and less sensitive to signal period fluctuation.

From the foregoing, it will be appreciated that the subject system apparatus and methodology achieves an accurate and efficient means for estimating a load bearing on a vehicle tire. A deformation signal is processed to produce an estimated contact patch length by employing an event detection algorithm to detect the occurrence of the deformation signal; a peak detection algorithm to detect within the deformation signal contact patch edge points; an estimation algorithm to calculate an edge distance between the contact patch edge points of the deformation signal; and an algorithm for calculating a time-span of the deformation signal by dividing the edge distance by a sampling frequency. An algorithm for calculating a contact patch length applies the time-span to a rolling radius of the tire and calculates an estimation of tire rolling speed by dividing the tire contact patch length by the time-span.

An inflation pressure sensor measures tire inflation pressure and provides pressure input data to an ANN at regular intervals. A deformation measuring sensor, preferably a piezoelectric bending sensor, is mounted in a tire tread region. The sensor employs a piezoelectric bending film which generates the deformation signal responsive to a bending of the sensor as the sensor rotates through a rolling tire footprint. The deformation signal is processed to estimate a length of the tire contact patch generated within the tire footprint as described previously. An estimation of tire rolling speed may further be ascertained from the deformation signal. A preprogrammed ANN, artificial neural network, receives, as input data the tire rolling speed estimation, the contact patch length estimation, the signal strength data, and the measured inflation pressure of the tire. The artificial neural network, which has been pre-programmed to interpret various input data quantitative combinations, analyzes the input data and generates an appropriate output load estimation based thereon.

Variations in the present invention are possible in light of the description of it provided herein. While certain representative embodiments and details have been shown for the purpose of illustrating the subject invention, it will be apparent to those skilled in this art that various changes and modifications can be made therein without departing from the scope of the subject invention. It is, therefore, to be understood that changes can be made in the particular embodiments described which will be within the full intended scope of the invention as defined by the following appended claims.

What is claimed is:

1. A method of estimating a load bearing on a vehicle tire, comprising:
  (A) deploying a deformation measuring sensor in the vehicle tire, the deformation measuring sensor generating a cyclical tire deformation signal indicative of tire deformation in a contact patch of a rolling tire;
  (B) deploying a tire inflation pressure measuring sensor in the vehicle tire, the inflation pressure measuring sensor measuring tire inflation pressure from within a tire cavity; calculating a tire rolling speed estimation based upon the tire deformation signal;
  (C) calculating a tire contact patch length estimation based upon the tire deformation signal;

(D) calculating a load estimation on the tire based upon the tire inflation pressure, the tire contact patch length estimation, and the tire rolling speed estimation and further comprising:

detecting a leading and a trailing contact edge point in the deformation measuring signal using a peak detection algorithm;

estimating a peak-to-peak amplitude variation in the deformation signal;

calculating the load estimation on the tire based upon the tire inflation pressure, the tire contact patch length estimation, the tire rolling speed estimation, and the peak-to peak amplitude magnitude of the deformation signal to estimate a tire deformation magnitude.

2. The method of claim 1, wherein the tire deformation signal comprises a pulse extending between the contact edge points in the signal, the contact edge points commencing with the deformation measuring sensor rotating into the tire footprint and substantially concluding with the deformation measuring sensor rotating out of the tire footprint.

3. The method of claim 2, wherein a tire deformation signal is generated with each tire revolution.

4. A method of estimating a load bearing on a vehicle tire, comprising:

(A) deploying a deformation measuring sensor in the vehicle tire, the deformation measuring sensor generating a cyclical tire deformation signal indicative of tire deformation in a contact patch of a rolling tire;

(B) deploying a tire inflation pressure measuring sensor in the vehicle tire, the inflation pressure measuring sensor measuring tire inflation pressure from within a tire cavity; calculating a tire rolling speed estimation based upon the tire deformation signal;

(C) calculating a tire contact patch length estimation based upon the tire deformation signal;

(D) calculating a load estimation on the tire based upon the tire inflation pressure, the tire contact patch length estimation, and the tire rolling speed estimation and wherein the deformation signal comprises a pulse having leading and trailing edge points identifying boundaries of the contact patch and the contact patch length and wherein calculating the tire rolling speed estimation comprises applying an event detection algorithm to detect the occurrence of a deformation signal and using a peak detection algorithm to detect contact edge points in the deformation signal; estimating an edge distance between the contact edge points of the deformation signal; calculating a time-span by dividing the edge distance by a sampling frequency; and calculating tire rolling speed by dividing a tire contact patch length estimation by the time-span.

5. The method of claim 4, wherein calculating the tire contact patch length estimation comprises multiplying a speed of the tire times the time-span.

6. The method of claim 5, wherein calculating a load estimation on the tire comprises applying as input data the tire rolling speed estimation, the contact patch length estimation, and the inflation pressure of the tire to an artificial neural network programmed to interpret the input data and output a load estimation.

7. The method of claim 6, wherein the deformation measuring sensor comprising a piezoelectric film sensor mounted to a tire region, the film sensor operable to proportionally bend with deformation of the tire region as the tire region creates a contact patch against a ground surface, whereupon the film sensor generating the tire deformation signal.

8. The method of claim 7, wherein the tire deformation signal has an amplitude and period proportional to a deformation magnitude of the tire region; and the method further comprising applying as an additional input the deformation signal amplitude into the artificial neural network programmed to interpret the deformation signal amplitude with the tire rolling speed estimation, the contact patch length estimation, and the inflation pressure of the tire to render an output load estimation.

9. A system of estimating a load bearing on a vehicle tire, comprising:

(A) a vehicle tire supporting a load;

(B) an inflation pressure measuring sensor for measuring tire inflation pressure and generating a measured tire inflation pressure signal;

(C) a deformation measuring sensor mounted in a tire region of the vehicle tire, the deformation measuring sensor comprising a piezoelectric sensor rotating with the tire region through a tire footprint, the deformation measuring sensor generating within the tire footprint a deformation signal indicative of opposite edge boundaries of a footprint contact patch and a length of the contact patch;

(D) a programmed data processor for calculating a contact patch length estimation from the deformation signal;

(E) a programmed data processor for calculating a tire rolling speed estimation from the deformation signal;

(F) an artificial neural network programmed to adaptively interpret the tire rolling speed estimation, the contact patch length estimation, and the measured inflation pressure of the tire and generate an output load estimation based thereon.

10. The system of claim 9, further comprising a programmed data processor for calculating an amplitude estimate of the deformation signal and the artificial neural network being additionally programmed to interpret the amplitude estimation with the tire rolling speed estimation, the contact patch length estimation, and the measured inflation pressure of the tire to generate the output load estimation.

11. The system of claim 10, wherein the deformation measuring sensor comprises a piezoelectric film sensor mounted to the tire to roll through a tire footprint as the tire rotates.

12. The system of claim 11, wherein the programmed data processor for calculating a contact patch length comprises an event detection algorithm to detect the occurrence of the deformation signal, a peak detection algorithm to detect within the deformation signal contact edge points; an estimation algorithm to calculate an edge distance between the contact edge points of the deformation signal; and an algorithm for calculating a time-span of the deformation signal by dividing the edge distance by a sampling frequency; and an algorithm for calculating a contact patch length by applying the time-span to a rolling radius of the tire.

13. The system of claim 12, wherein the programmed data processor for calculating the tire rolling speed comprises an algorithm dividing the tire contact patch length by the time-span.

14. The system of claim 12, wherein the programmed data processor for calculating the amplitude estimate of the deformation signal comprises an algorithm to detect within the deformation signal a peak to peak amplitude variation at the deformation signal contact edge points.

* * * * *